United States Patent Office 3,808,161
Patented Apr. 30, 1974

3,808,161
BARRIER COATING COMPOSITION COMPRISING ACRYLAMIDE AND STYRENE POLYMERS FOR CELLULOSE WEBS
Otto Mack Lipscomb, Jr., Westwood, N.J., assignor to American Cyanamid Company, Stamford, Conn.
No Drawing. Filed Nov. 8, 1971, Ser. No. 196,773
Int. Cl. C08f 45/24; C08g 9/06
U.S. Cl. 260—17.4 ST   2 Claims

ABSTRACT OF THE DISCLOSURE

A mixture consisting essentially of a water-soluble predominantly acrylamide polymer and a hydrophilic-hydrophobic vinyl polymer containing 25 to 75 mol percent of styrene linkages provides an excellent barrier surface when an aqueous dispersion of the mixture is applied to a cellulose web (which may be Masonite) and dried. Water-soluble starches act as extenders for this mixture.

---

The present invention relates to compositions particularly suitable for providing fibrous cellulose webs with a solvent-resistant barrier coating.

At the present time, it is general practice to apply solvent-based coating compositions (usually paint primers and printing inks) to fibrous cellulose articles. As used herein the term "fibrous cellulose articles" includes water-laid cellulose webs such as paper and paperboard and the term also includes the hard building board known as "Masonite" prepared by compressing raw wood fibers at a temperature of 400° F.–500° F. and boards prepared from air-laid fibers. A difficulty encountered in the application of inks and paints to such webs is that at least a part of the solvent content of the applied compositions (together with at least a part of the resin binder content thereof) is absorbed by the cellulose and so is lost from the composition. As a result, in such instances, an unduly large amount of these components is needed for development of a coating of acceptable properties. It has accordingly become desired to provide such webs with a barrier coat which will substantially prevent absorption by the cellulose of the aforesaid solvents and resinous binders.

The discovery has now been made that a surface film consisting essentially of 1 to 2 parts by weight of a water-soluble polymer predominantly composed of acrylamide linkages and 2 to 1 parts by weight of a hydrophilic-hydrophobic vinyl polymer containing about 25 to 75 mol percent of styrene or similar hydrophobic linkages provides an excellent barrier coating. I have further found that such film can readily be formed by applying an aqueous dispersion of the two components within the disclosed range to a fibrous cellulose web and allowing the composition to dry at room or at elevated temperature.

The important additional discovery has been made that soluble starch is compatible with the aforesaid aqueous dispersion and that it improves the barrier properties of the composition even when present in major proportion, e.g., up to about 8 parts per part of the combined solids of the dispersion. The starch thus acts as extender for the primary components of the composition.

The composition of the present invention (without or with starch) possesses several important properties. One is that in preferred embodiments it permits the amount of paint primer needed to provide a hold-out layer for a finish paint coat to be decreased by about 50%. Another is that the barrier coating it affords is independent of the substrate. Thus, when it is applied to the rough side of Masonite board (i.e., the side which carries the marks of the steel screen on which the board is formed by compression) it masks the marks so that they are rendered invisible when the board is subsequently painted with wall paint or enamel. The composition similarly renders invisible any similar marks present in air-laid webs.

The composition of the present invention consists essentially of 1 to 2 parts by weight of a water-soluble polymer predominantly composed of acrylamide linkages and 2 to 1 parts by weight of a hydrophilic-hydrophobic vinyl polymer containing 25 to 75 mol percent of styrene linkages. The mix may contain up to 8 parts by weight of a water-soluble starch per part by weight of the mixture of polymers.

The mix may be in the form of a dry particulate free-flowing blend. It is applied as an aqueous dispersion, the amount of water being sufficient to provide a composition of convenient viscosity. Generally in the range of 15%–20% total solids by weight the dispersion possesses a viscosity which permits it to be applied by the selected method.

The barrier composition of the present invention can be applied by brush, by spray, by roller coater, by Meyer rod, or by any other similar means.

Sufficient of the composition is applied to provide the substrate with a continuous film of the composition. In large scale trials I have found that application of sufficient of the composition to provide 1 lb. of the components (dry basis) per 1,000 ft.$^2$ of substrate surface results in development of a very satisfactory barrier film, and evidently a somewhat thinner film would be useful.

The composition develops its barrier properties even when dried at room temperature. It is stable to elevated temperatures and hence may be applied to Masonite board as it is discharged from the forming press, at which point the board has a temperature of 400° F.–500° F. When applied in this manner the composition dries in a few seconds and a very satisfactory barrier coat is formed.

More in detail, the first component of the barrier coating mix, as aforesaid, is a water-soluble polymer predominantly composed of acrylamide linkages. In such linkages the acrylamide is unsubstituted. This material may be polyacrylamide itself but better barrier properties are provided when the polymer contains a minor amount of acid linkages such as those which are imparted by acrylic acid, allyl sulfonic acid, maleic acid, and maleamic acid.

The second component of the mix, as aforesaid, is a hydrophilic-hydrophobic vinyl polymer containing 25 to 75 mol percent of hydrophobic linkages. A polymer of this type is prepared by copolymerizing styrene with maleic anhydride in 1:1 molar ratio followed by hydrolyzing the anhydride substituents to carboxylic substituents. A suitable polymer is also prepared by copolymerizing 9 mols of acrylamide with 1 mol of styrene. In place of styrene there may be employed vinyl naphthalene, vinyl stearate or lauryl acrylate. A variety of other polymers suitable for this purpose are disclosed in application Ser. No. 211,623, filed by Edward Strazdins on Dec. 23, 1971. The aforesaid compositions, before use, are adjusted to an alkaline pH preferably about 8–9 so as to solubilize the carboxyl substituents present without hydrolyzing the amide substituents.

As starches for inclusion as extenders in the composition there may be employed boiled potato starch or boiled corn starch. Because of its superior properties as film-forming extenders, I prefer a boiled starch which has been reacted with a small amount (for example 2% to 5% of its weight) of ethylene oxide or similar oxide.

Furthermore, in place of the aforesaid starch or in conjunction therewith, there may be added hydrolyzed polyvinyl acetate of film forming grade, sodium alginate, or gum karrageen in amounts not more than about four times the combined weight of the two primary barrier coat components.

If desired, the composition may contain any of the components heretofore employed in barrier coating which do not alter the essential character of these coatings. The coating may contain a dye or pigment to permit ready determination of any failures in the continuity of the applied barrier coat, and may contain a perfume to mask any odors present.

The invention is more particularly illustrated by the examples which follow. These examples are preferred embodiments of the invention and are not to be construed in limitation thereof.

EXAMPLE 1

A dry free-flowing mix is prepared from 66 g. of a 92:8 acrylamide:acrylic acid copolymer and 33 g. of powdered 1:1 molar ratio styrene:maleic anhydride copolymer both finely ground. The mixture is storage-stable at 35° C.

To this mix is added 400 cc. of water with stirring, and the pH of the resulting slurry is maintained at 9 by intermittent addition of aqueous sodium hydroxide until the anhydride substituents have hydrolyzed and have been neutralized to sodium salt state. The product is a mobile milky dispersion having the viscosity of paint.

EXAMPLE 2

A portion of the above dispersion is diluted to 15% solids by weight and is applied to a sheet of coating raw stock paper by means of a Meyer rod at the rate of 7 lb. of the suspension per 1,000 ft. of surface. The paper is dried in a forced draft oven at 200° F. for 5 minutes.

The solvent resistance of the paper is determined by the TAPPI T455–M44 method wherein some drops of dyed turpentine (a typical solvent) are applied to a cone of sand on the coated side of the paper and the time noted for the turpentine to strike through the coating. The turpentine evaporates before it strikes through the coating, showing that the coating possesses sufficient barrier coating for use in connection with applied paints, enamels, and painting inks.

EXAMPLE 3

The procedure of Example 1 is repeated. To the product is added 2,500 cc. of water and 600 g. of boiled potato starch which had been reacted with 3% (based on its weight) of ethylene oxide. The slurry is heated to 200° F. and stirred until the starch is wet out and solubilized. The slurry is adjusted to a brushable viscosity (about 15%) by addition of water and is applied to an air-laid cellulose fiber building board by brush. The board is dried at room temperature and possesses an excellent barrier coating.

EXAMPLE 4

The composition of Example 3 is applied by roller coater to the rough or "wire" side of Masonite board ¼" thick as it emerges from the forming press at a temperature of 400° F.–500° F. The composition dries within a few seconds and the board carries an excellent solvent barrier film when tested by the method of Example 1. The coated side accepts an interior white pigmented oil based primer very well and no loss occurs of solvent or oil into the board. When dry the primed side is painted with a white pigmented interior flat paint. A uniform coating is achieved and the marks of the wire are masked by the paint.

I claim:
1. A mixture consisting essentially of 1 to 2 parts by weight of a water-soluble polymer predominantly composed of unsubstituted acrylamide linkages, 2 to 1 parts by weight of hydrophilic-hydrophobic vinyl polymer containing 25 to 75 mol percent of styrene linkages, and a water-soluble starch as extender.
2. A mixture according to claim 1 wherein the water-soluble starch is ethylene oxide-reacted starch.

References Cited

UNITED STATES PATENTS

| | | | |
|---|---|---|---|
| 3,647,507 | 3/1972 | Ashcraft | 260—117 |
| 3,674,474 | 7/1972 | Kuro Kawa et al. | 117—161 UN |
| 3,450,680 | 6/1969 | Jurisch et al. | 260—29.6 H |

FOREIGN PATENTS

| | | | |
|---|---|---|---|
| 971,634 | 9/1964 | Great Britain | 260—29.7 B |

WILLIAM H. SHORT, Primary Examiner

E. WOODBERRY, Assistant Examiner

U.S. Cl. X.R.

117—155 UA, 143, 161 C, UZ, UN; 260—29.6 H